Nov. 15, 1960    J. W. BRUNDAGE    2,959,815
TIRE CURING PRESS

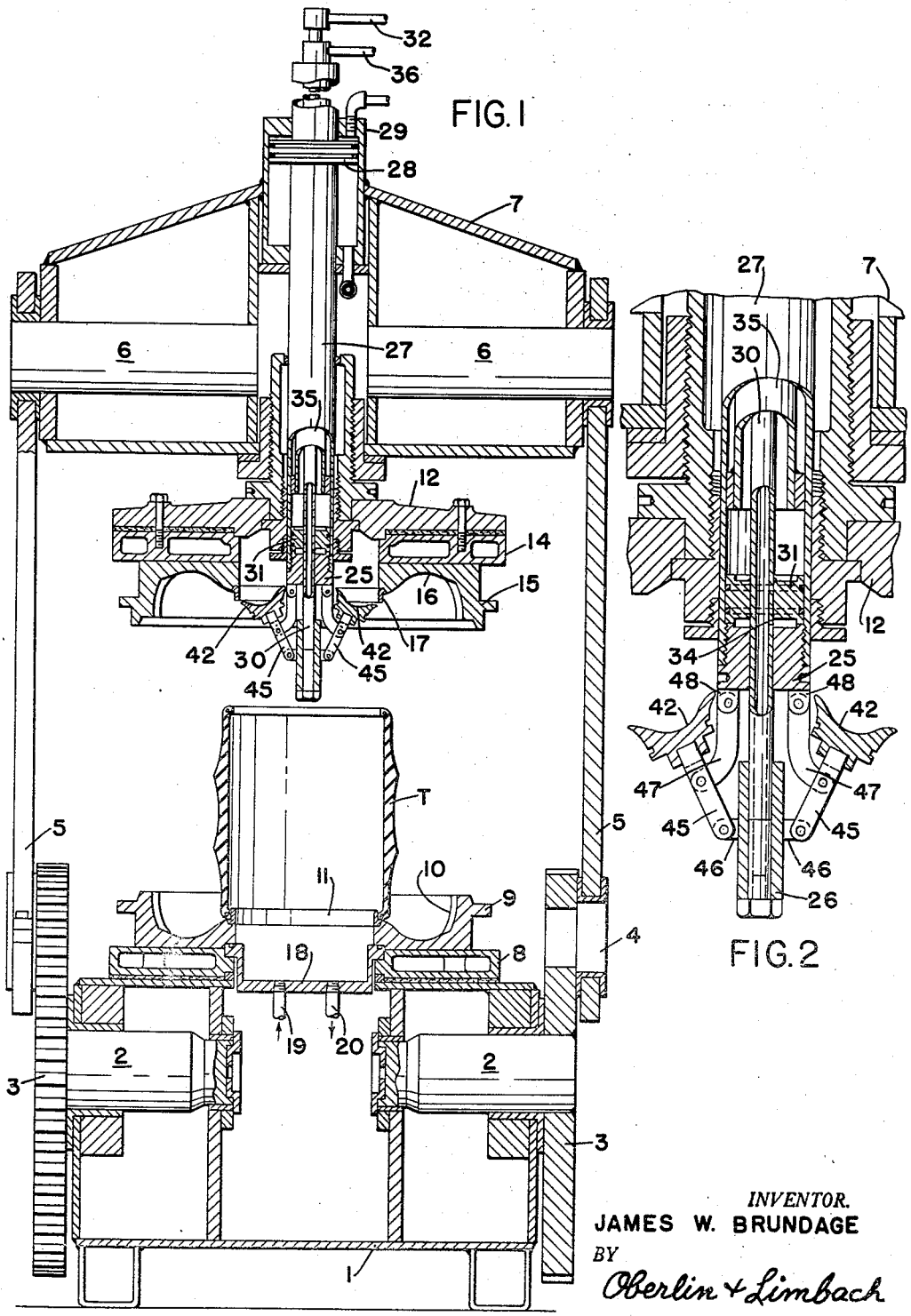

Filed June 17, 1955

INVENTOR.
JAMES W. BRUNDAGE
BY
Oberlin & Limbach
ATTORNEYS

Nov. 15, 1960     J. W. BRUNDAGE     2,959,815
TIRE CURING PRESS
Filed June 17, 1955     6 Sheets-Sheet 3
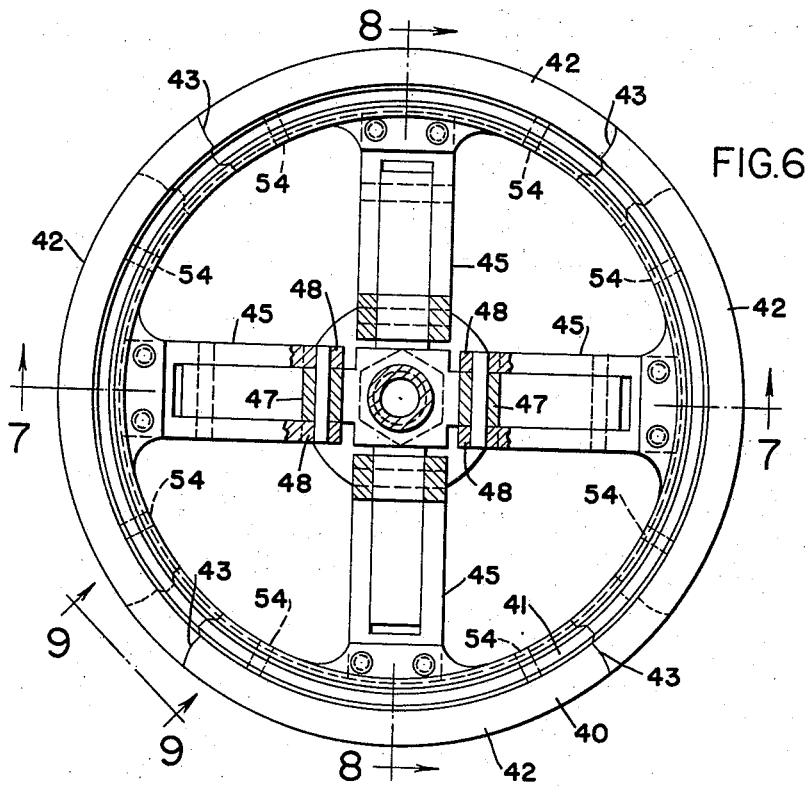
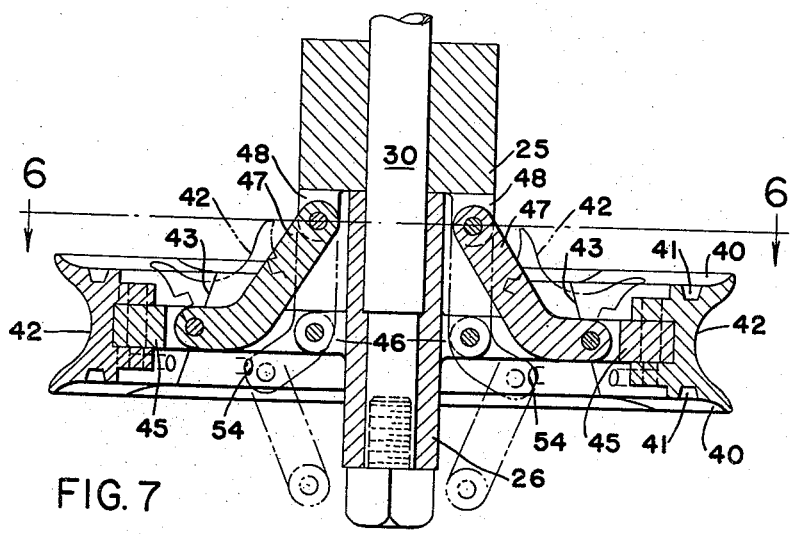
*INVENTOR.*
JAMES W. BRUNDAGE
BY
*Oberlin + Limbach*
ATTORNEYS

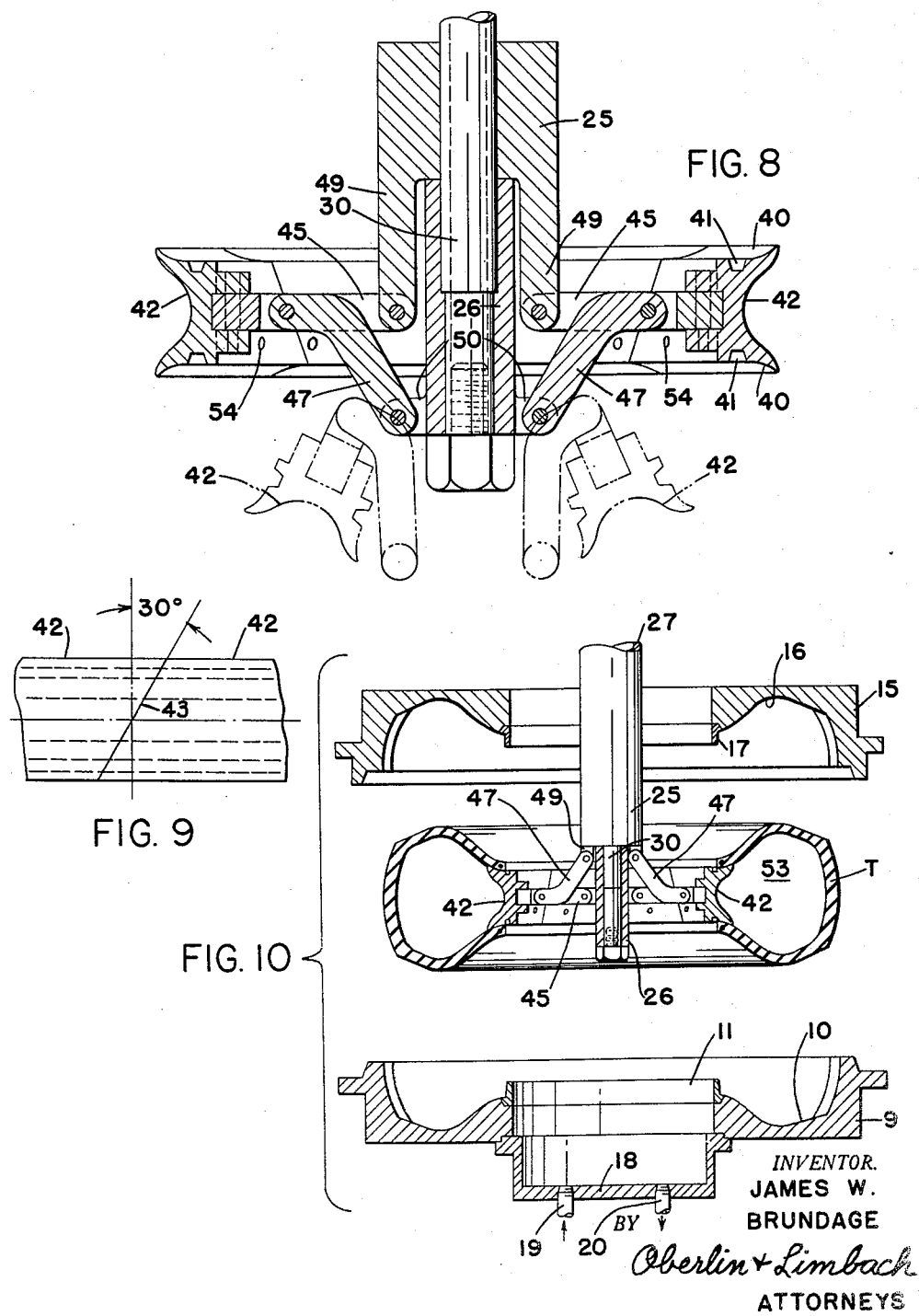

Nov. 15, 1960 J. W. BRUNDAGE 2,959,815
TIRE CURING PRESS

Filed June 17, 1955 6 Sheets-Sheet 5

INVENTOR.
JAMES W. BRUNDAGE
BY
*Oberlin + Limbach*
ATTORNEYS

Nov. 15, 1960   J. W. BRUNDAGE   2,959,815
TIRE CURING PRESS

Filed June 17, 1955   6 Sheets-Sheet 6

INVENTOR.
JAMES W. BRUNDAGE
BY
*Oberlin & Limbach*
ATTORNEYS 2,959,815
Patented Nov. 15, 1960

2,959,815

TIRE CURING PRESS

James W. Brundage, Akron, Ohio, assignor to National Rubber Machinery Company, Akron, Ohio, a corporation of Ohio Filed June 17, 1955, Ser. No. 516,141

15 Claims. (Cl. 18—17)

The present invention relates generally as indicated to a tire curing press, and more particularly to improvements in a press for shaping and curing tubeless tires.

For the most part, new passenger cars now are factory-equipped with tubeless tires; and by reason of the superior construction of such tires whereby they are impervious to air, water, and steam, it is herein proposed to utilize the tubeless tire improvements in the simplification of the tire curing press by omission of the curing bag or diaphragm.

However, one problem encountered in the shaping and curing of tubeless tires without curing bags or diaphragms therewithin, is that the beads thereof are apt to be misshapen, inaccurate, and spongy in character rather than accurately compressed to desired firm shape. As will be appreciated, in wheels having tubeless tires mounted thereon, the entire peripheries of the beads must make airtight seals around the rims and rim flanges; and, in order to accomplish such airtight seals, inaccuracy, sponginess, and other defects in the tire beads cannot be tolerated.

Accordingly, it is a principal object of this invention to provide a tire curing press by means of which tubeless tire beads are accurately shaped to proper size and are uniformly compressed to eliminate sponginess thereof.

Another object of this invention is to provide a tire curing press in which the tire beads are in unclamped condition during the low pressure shaping operation from pulley-band form to generally tire form, whereby the components of the carcass at the beads are not restrained and may adjust themselves and turn about the bead rings and properly seat in the toe rings of the mold sections before being securely clamped and compressed to not only accurately form the beads but, additionally, to establish fluid seals for the circulation of curing medium under high pressure through the shaped carcass.

Another object of this invention is to provide a tire curing press in which the aforesaid bead-clamping mechanism is fluid pressure actuated.

Another object of this invention is to provide a tire curing press in which the bead-compressing and shaping elements are segments of a collapsible ring which ring, when collapsed, may be readily axially inserted into a pulley-band carcass and from which ring, when collapsed, the cured tire may be readily discharged.

Another object of this invention is to provide a tire curing press in which the aforesaid collapsible bead-clamping and forming assembly, when in its uncollapsed condition, provides continuous bead-contacting surfaces operative to uniformly compress and to accurately shape the beads of the carcass against the bead molding surfaces of the tire mold sections.

Another object of this invention is to provide a tire curing press having bead-forming elements which may be operated to distend the cured tire so that condensate (in the case of steam curing) or water (in the case of hot water curing) may be drained out of the tire and out of the press.

Another object of this invention is to provide a segmental bead-contacting assembly wherein some of the segmental sections swing upwardly and inwardly while other segmental sections swing downwardly and inwardly to provide a collapsed assembly which may be easily inserted into and withdrawn from a pulley-band carcass and cured tire respectively.

Another object of this invention is to provide a segmental bead-contacting assembly of the character described in the preceding paragraph wherein the oppositely swinging segments are axially separable to facilitate distention of the cured tire by employing the respective segments to hold the beads of the tire against the mold sections as the press is initially opened a small amount.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a vertical cross-section view of the present tire curing press showing one form of the collapsible bead-pressing assembly in its elevated and collapsed condition to clear the space between the separated mold sections for the lateral insertion of a pulley-band carcass therebetween;

Fig. 2 is a fragmentary cross-section view, on a somewhat enlarged scale, showing the details of the collapsed and elevated bead-pressing assembly;

Figure 3:
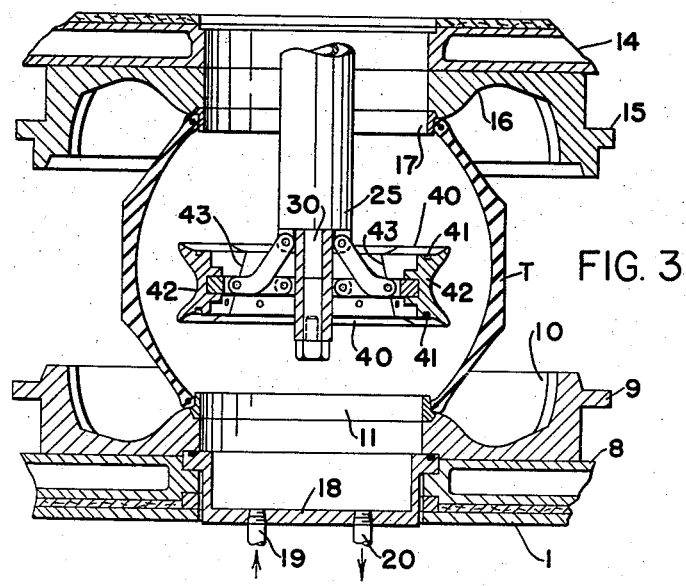
Figure 4:
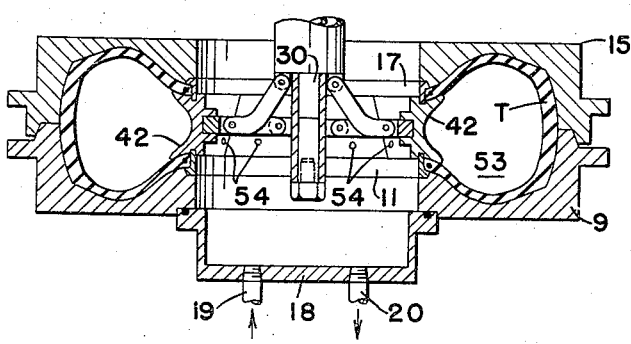
Figure 5:
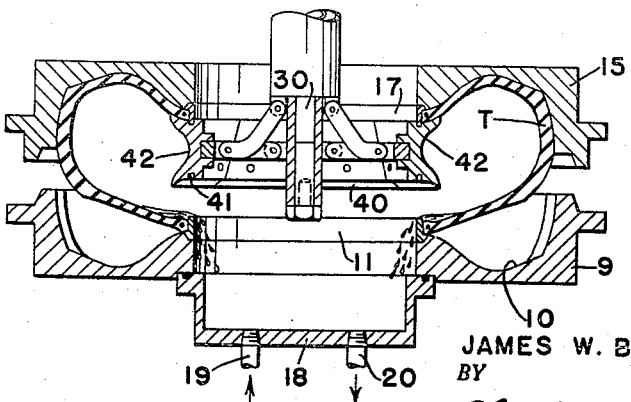
Figure 11:
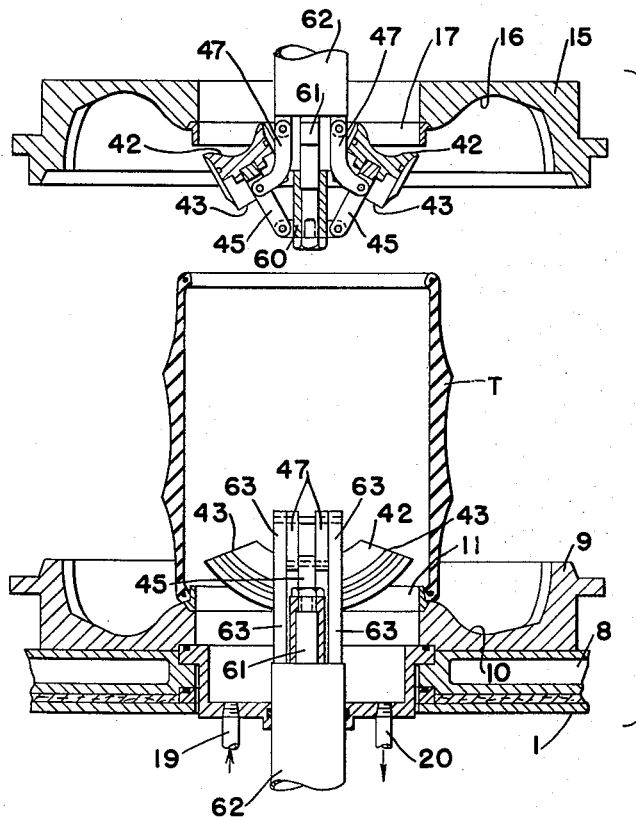
Figure 12:
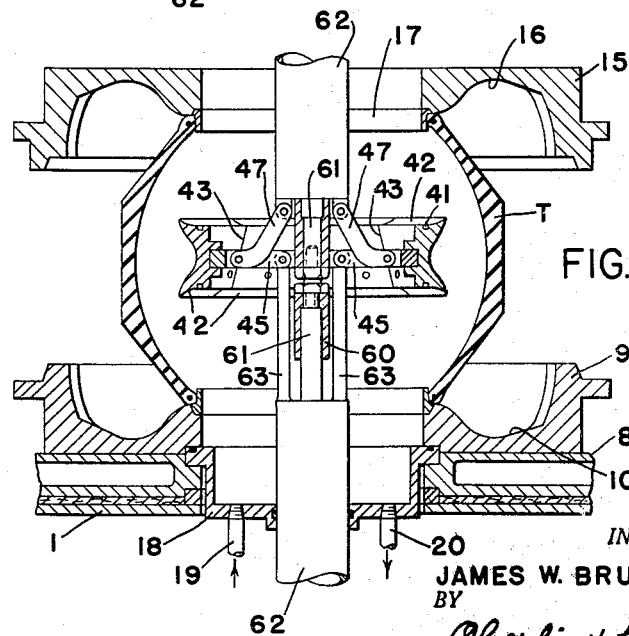
Figure 13:
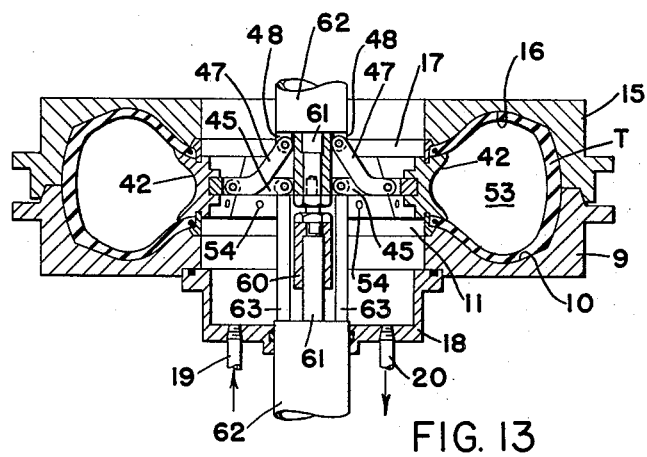
Figure 14:
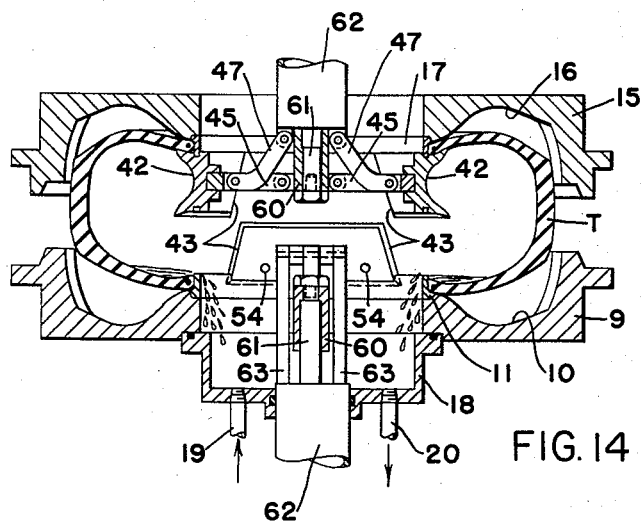

Figs. 3, 4 and 5 are fragmentary vertical cross-section views respectively showing the bead-pressing assembly inserted into a partly shaped carcass and uncollapsed therewithin to its normal operating condition; the mold sections in mating engagement with the bead-pressing assembly in its final operating position wherein it compacts and accurately shapes the tire beads; and the initial separation of the mold sections to achieve drainage of condensate (in the case of steam cure) or water (in the case of hot water cure) from the cured tire;

Figs. 6, 7, 8, and 9 are views of the collapsible bead-pressing assembly as viewed respectively along the lines 6—6, Fig. 7, and lines 7—7, 8—8, and 9—9 of Fig. 6;

Fig. 10 is a partial cross-section view of the press, similar to Figs. 3–5, except illustrating the mold sections in separated condition with the cured tire supported on the bead presser assembly ready for discharge therefrom upon collapsing of said assembly; and Figs. 11–14 illustrate a press equipped with another form of bead-shaping assembly, Fig. 11 showing the press in open position with the segments of the bead-shaping assembly collapsed and axially separated, Fig. 12 showing the press partly closed with the segments brought together and uncollapsed within the partly shaped carcass, Fig. 13 showing the press fully closed, and Fig. 14 showing the press partly open with the respective segments clamping the beads for distending, and thus drawing, the cured tire.

Basically, the tire curing press may be similar to that disclosed in my copending application Serial No. 353,354, filed May 6, 1953. As here shown, the press comprises a hollow base 1 in which are journalled the stub shafts 2 of bull gear cranks 3, the latter having crank pins 4 to which the lower ends of links 5 are pivotally connected. The upper ends of said links 5 are pivotally connected to the shafts 6 of an upper press head 7 which is guided for vertical movement along a column or columns (not shown) which extend upwardly from base 1.

The top of the base 1 has mounted thereon a heating platen 8 to which an upwardly facing bottom mold section 9 is secured, said mold section being formed with a cavity 10 conforming to one-half the tread, one side wall, and one bead of the finished tire. Said bottom mold section 9 has secured thereto a toe ring 11 which forms the inside surface of the tire bead and a portion of the outside bead surface. Obviously, if desired, said toe ring 11 may be an integral part of the bottom mold section 9.

The upper press head 7 carries a vertically adjustable plate 12, to the lower face of which a heating platen 14 is secured, the latter, in turn, carrying a downwardly facing top mold section 15. Said top mold section 15 is formed with a cavity 16 which defines the rest of the tire molding surface; and, if desired, a separate toe ring 17 may be secured to mold section 15 to define the inner surface of the other tire bead.

When the upper press head 7 is moved downwardly to bring the top mold section 15 into mating engagement with the bottom mold section 9, the respective cavities 16 and 10 define a tire-shaped cavity therebetween in which a shaped tire is adapted to be cured or vulcanized by circulation of curing medium such as steam or hot water through the chamber inside the shaped carcass and through the heating platens 14 and 8.

Secured between the bottom mold section 9 and the heating platen 8 is the flange of a closure member 18 to which is connected a supply pipe 19 for shaping air and for curing medium and a drain pipe 20. It is to be understood that suitable valves will be provided to control admission of shaping air and curing medium through pipe 19 and to open and close the drain pipe 20.

The collapsible bead presser assembly herein disclosed in Figs. 1–10 comprises upper and lower relatively axially movable heads 25 and 26, to the upper one of which an upwardly extending tube 27 is threadedly secured, said tube being formed as a piston rod connected to a piston 28 which is reciprocable in a double-acting cylinder 29 mounted at the top of the upper press head 7.

When fluid under pressure is admitted from the bottom of said cylinder 29, the piston 28, and thus the upper head 25 of the bead presser assembly, will be elevated as shown in Fig. 1 to the press-loading position whereat the pulley-band carcass T may be freely laterally inserted and set upon the bottom toe ring 11 in upright position.

When fluid under pressure is admitted into the top of said cylinder 29, the piston 28, and thus the upper head 25 of said assembly, will be moved downwardly with respect to the top mold section and into the pulley-band carcass while the assembly is yet in its collapsed condition as shown in Fig. 1 and also in Fig. 2.

The lower head 26 of said assembly is axially fixedly secured to a tube 30 which extends upwardly all the way through the aforesaid upper head 25 and tube 27. Said tube 30 has welded or otherwise secured thereto a piston 31 (see Fig. 2) which is reciprocable in the surrounding tube 27, said tube 30 being connected to a fluid pressure supply pipe 32, and being formed with an opening 34 just below the piston 31 whereby, when fluid under pressure is admitted into said tube 30, the fluid under pressure will react against the top of the upper head 25 and thereby move the piston 31, together with the lower head 26, upwardly with respect to the upper head 25.

Fixedly mounted with respect to the outer tube 27 is an intermediate tube 35 through which fluid under pressure may be admitted through the pipe 36 to act on the top of the piston 31 to force the lower head 26 of the bead-pressing assembly downwardly with respect to the upper head 25 thereof.

Thus, there is provided herein a fluid pressure actuated bead-pressing assembly in which the entire assembly is vertically reciprocated by means of a double-acting piston and cylinder 28—29 and wherein the upper and lower heads 25 and 26 of the assembly are relatively moved toward and away from each other in an axial direction by means of another double-acting piston and cylinder 31—27.

The details of construction of the collapsible bead-pressing assembly is most clearly shown in Figs. 6–9, wherein, when in its uncollapsed operating condition, said assembly provides opposite annular surfaces 40 adapted to press and shape the inside surfaces of the tire beads against the bead-molding surfaces of the bottom and top mold sections 9 and 15.

Within such pressing and shaping surfaces 40 are annular grooves 41 adapted to closely fit over the ends of the respective toe rings 11 and 17 so that, when the press is closed as in Fig. 4, the beads of the tire will be accurately and uniformly compressed and shaped between said annular surfaces 40 and the bead-molding surfaces of the toe rings 11 and 17 and mold sections 9 and 15.

In order to render said bead-pressing assembly radially collapsible, it is made up of two pairs of arcuate segments 42 which have their ends cut along a bias 43 which are identical except for the fact that one pair of diametrically opposite segments are upside-down with respect to the other pair. In this way, and by reason of the bias joints 43, one pair of segments may be swung upwardly and inwardly and the other pair may be swung downwardly and inwardly.

Such swinging of the pairs of segments 42 as aforesaid is effected by securing radially inwardly extending members 45 to the respective segments, one pair of said members 45 being pivotally connected at their inner ends to the ears 46 of the lower head 26. Angular links 47, in turn, are pivotally connected at their outer ends to said members 45 and at their inner ends or upper ends to the ears 48 of the upper head 25.

Thus, as shown in Fig. 7, when the lower head 26 is moved downwardly with respect to the upper head 25, the pair of segments 42 will be swung upwardly and inwardly to the dot-dash line positions and thereby be withdrawn radially inwardly so that these segments will clear the beads of the tire T.

The other pair of segments 42 as shown in Fig. 8, are also provided with inwardly extending members 45, the inner ends of which are pivotally connected to ears 49 of the upper head 25, and in this case the angular links 47 have their outer ends connected pivotally to said members 45 and their inner or lower ends pivotally connected to ears 50 of said lower head 26, whereby upon downward movement of said lower head 26 with respect to the upper head 25, said pair of segments 42 shown in Fig. 8 will be swung inwardly and downwardly to the dot-dash line positions and thereby be withdrawn radially inwardly so as to clear the tire beads for easy insertion and withdrawal of the assembly into and out of the tire when in its pulley-band form and when in its final cured form.

A notable feature of the collapsible assembly just described in connection with Figs. 6–9, is that the segments 42, the inwardly extending members 45 secured to the respective segments, and the angular links 47 are identical except that, in the case of the segments 42 and links 47, one pair of each is upside-down with respect to the other pair.

The following example of the operation of the tire curing press of Figs. 1 to 10 is to be regarded as merely illustrative of a preferred sequence of operation which may be variously modified within the scope of this invention.

When the upper press head 7 is in its raised position and the bead-pressing assembly is in its raised position with respect to the top mold section 15 and is in its collapsed condition, the space between the bottom and top mold sections 9 and 15 is unobstructed for the lateral insertion of a pulley-band tire carcass T. The pulleyband carcass T is inserted and is set upon the bottom toe ring 11 in upright position as best shown in Fig. 1, with its top bead coaxially positioned for engagement by the top toe ring 17 upon downward movement of the upper press head 7.

With the pulley-band carcass T properly loaded and supported around the bottom toe ring 11, the bull gear cranks 3 may be rotated by a suitable power drive mechanism (not shown) to cause the upper press head 7 to move downwardly, whereupon the collapsed bead-pressing assembly freely enters the pulley-band carcass T and the top toe ring 17 contacts the top bead of the carcass.

At this stage of the operation, air under a relatively low pressure of say 7 to 15 p.s.i., for example, is admitted through the pipe 19 connected to the closure member 18, and this shaping air pressure together with the movement of the carcass beads toward each other, effects a progressive swelling of the carcass T as is shown in Fig. 3. At this stage of the press-closing movement, fluid under pressure may be admitted into the cylinder 29 on top of the piston 28 to bodily actuate the collapsed bead-pressing assembly downwardly well into the swelled-out portion of the carcass T.

Then, at about the same time, or thereafter, fluid under pressure may be admitted through the pipe 32 to act under the piston 31 to thus raise the lower head 26 of said bead-pressing assembly upwardly with respect to the upper head 25 of said assembly. In this way, the pairs of segments 42 will be swung downwardly and outwardly and upwardly and outwardly, respectively, to the uncollapsed condition shown in Fig. 3 to form a continuous ring having opposite annular surfaces 40 and opposite annular toe-ring-receiving grooves 41.

As the press-closing movement continues, the carcass components at the beads may turn and adjust themselves around the respective toe rings 11 and 17 without hindrance, and finally, when the bottom and top mold sections 9 and 15 are in mating engagement as in Fig. 4, the bead-pressing surfaces 40 will clamp and shape the beads accurately and uniformly, since the toe rings 11 and 17 and segments 42 are now in metal-to-metal abutting engagement.

When the press is closed as in Fig. 4, curing medium under pressure of say 100 to 250 p.s.i. is admitted through the pipe 19 connected to the closure member 18, and the curing medium flows into the chamber 53 inside the tire T, as by way of holes 54 in the segments, to effect final shaping and curing thereof. If desired, the holes 54 may be disposed non-radially so as to effect swirling of the curing medium around chamber 53.

After the tire T has been cured, this usually taking 15 to 20 minutes or less (by reason of direct heat transfer), the upper press head 7 is moved upwardly to partly raise the top mold section 15 as shown in Fig. 5, and at the same time, fluid under pressure under the piston 28 holds the bead-pressing assembly against the top bead of the tire T.

In this way, the lower side wall and lower half of the tread of the tire T will be stripped from the bottom mold section 9; whereupon the curing medium or condensate therefrom will run out and drain out through the now-open drain pipe 20.

Upon further raising of the top mold section 15 to the Fig. 10 position, the bottom bead of the tire T will be stripped from the bottom toe ring 11, and, at this time, fluid under pressure will be admitted to act on the top of the piston 28 to force the bead-pressing assembly downwardly and thereby strip the cured tire T downwardly out of the top mold section 15.

The cured tire T is thus supported by the bead-pressing assembly out of contact with the hot mold sections 9 and 15, and is ready to be discharged onto a suitable platform (not shown) which may be inserted between the tire T and the bottom mold section 15. Such discharge of the tire T is effected by admitting fluid under pressure via pipe 36, to act on top of piston 31 to cause the lower head 26 of the bead-pressing assembly downwardly with respect to the upper head 25. The segments 42 are thereby swung and withdrawn from within the cured tire T and the latter will simply drop down onto such platform for withdrawal from the press.

The press is then actuated to the Fig. 1 position, whereupon the next pulley-band carcass T may be set on the bottom mold section 9 around the toe ring 11 thereof.

Referring now to the modification of the press and bead-pressing assembly illustrated in Figs. 11–14, the same reference numerals have been used to designate parts which are the same as or similar to the parts of the Figs. 1 to 10 embodiment of the invention.

In Figs. 11–14, the bead-pressing assembly, composed of two subassemblies, is basically the same as that of Figs. 1–10 except that the two pairs of swingable segments 42 are split for relative axial movement, one pair of segments being associated with the top mold section 15 and the other pair of segments associated with the bottom mold section 9.

The segments 42 of the top subassembly are adapted to be swung upwardly and inwardly as shown in Fig. 11, and, as before, said segments 42 have radially inwardly extending members 45 which are pivotally connected to ears of a head 60 (corresponding to head 26), said head being connected to a vertically reciprocable rod or tube 61 equivalent to tube 30 in Figs. 1–10. The angular links 47 have their outer ends pivotally connected to said members 45 and their inner or upper ends pivotally secured to ears of a vertically reciprocable head 62 which corresponds to the head 25 in Figs. 1–10.

As evident, the head 25 may be vertically reciprocated as before, i.e. by the piston 28, to bodily reciprocate the collapsed upper subassembly, and when the rod 61 and head 60 are moved axially upward with respect to said head 62, (as by a piston 31), the segments 42 will be swung outwardly so as to lie in a common horizontal plane.

The segments 42 of the bottom subassembly also have radially inwardly extending members 45 which are pivotally connected at their inner ends to the upstanding ears 63 of a head 62 which is vertically reciprocable in the base 1 of the press (as by a piston 28), said vertically reciprocable head 62 corresponding in function to the head 25 illustrated in Figs. 1–10.

In this case, the angular links 47 are pivotally connected at their outer ends to said radially inwardly extending members 45 and at their inner or lower ends to ears formed on a head 60, the head being axially fixedly connected to a rod 61, which rod again is vertically reciprocable with respect to the head 62 in the same way as is the rod in Figs. 1–10.

As evident, the bottom pair of segments 42 when in collapsed condition as shown in Fig. 11, may be bodily reciprocated up and down with respect to the bottom mold section 9, and when the rod 61 is actuated upwardly with respect to the head 62, said segments 42 will be swung outwardly and upwardly so as to be disposed in a common horizontal plane.

Again, as before, the segments 42 have their ends cut along a bias 43 so that, when the top and bottom subassemblies are uncollapsed and are brought together with the ends of rods 61 in abutment, all four segments 42 will lie in a common horizontal plane.

In Fig. 11, the press is shown in open position, the mold sections 9 and 15 being axially separated and the top and bottom pairs of segments 42 being axially withdrawn and collapsed so as to facilitate the placing of the pulley-band carcass T upon the toe ring 11 of the bottom mold section 9 in upright position for engagement of the top bead by the top toe ring 17.

As the press is moved toward closed position, the top toe ring 17 will engage the top bead of the carcass, and at this time shaping air pressure may be admitted through the pipe 19 of closure member 18 so as to effect in conjunction with the movement of the carcass beads toward each other a progressive swelling of the carcass T as is shown in Fig. 12, for example.

With the pulley-band carcass thus partly swelled as in Fig. 12, the bead presser subassemblies may be moved axially with respect to the mold sections 9 and 15 toward each other, and at the same time or thereafter, the rods 61 will be actuated with respect to the heads 62 to swing the segments to their uncollapsed conditions. As is shown in Fig. 12, the ends of the rods 61 are in abutment and the segments 42 now form continuous annular surfaces 40 and annular grooves 41 in exactly the same manner as already described in connection with Figs. 1–10.

As the mold sections 9 and 15 come together, the components of the carcas T at the beads, being unclamped, are free to adjust themselves in the bead seats formed by the toe rings 11 and 17. Finally, when the mold sections do come into mating engagement as in Fig. 13, the annular surfaces of the segments 42 serve to accurately shape and to compact the beads while curing medium is admitted through the pipe 19 and through the holes 54 in the segments 42 into the chamber 53 within the shaped carcass T.

The shaped carcass is thus cured, and after the cure the mold sections 9 and 15 are separated to a slight extent while the respective subassemblies are held against the bottom and top toe rings 11 and 17. As a result, the slight opening movement of the press will effect a distention of the cured tire T as shown in Fig. 14, so that the condensate or water from the cure may be readily drained out through the drain pipe 20.

After the draining operation has been completed, the upward movement of the top mold section 15 is continued and the bead-pressing subassemblies may be again brought together to the position shown in Fig. 12, whereby the cured tire T will be stripped from the mold sections 9 and 15 and supported in the manner shown in Fig. 10.

If desired, the bottom subassembly may be axially moved and the segments swung downwardly and inwardly, whereupon the tire T will then be supported by the top pair of segments 42. Then, an unloading platform (not shown) may be positioned under the tire T so that, when the top subassembly is collapsed and withdrawn upwardly, the cured tire T will be dropped onto such platform for withdrawal from the press.

The press parts are then returned to the initial condition of Fig. 11 preparatory to shaping and curing of the next tire.

While not shown herein, it is to be understood that a suitable automatic timing and sequence control mechanism may be used with both forms of the press herein to automatically achieve the successive movements of the mold sections and bead-pressing assembly in proper sequence. As evident to persons skilled in the art, such control mechanism may optionally be cam-operated, fluid-controlled, electrically controlled, or other known expedient.

Other modes of applying the principle of the invention may be employed, change being made as regards the details described, provided the features stated in any of the following claims, or the equivalent of such, be employed.

I therefore particularly point out and distinctly claim as my invention:

1. In a tire curing press, the combination of a pair of complementary mold sections and means for relatively moving same from axially separated position to mating engagement and vice versa; said mold sections being designed to contact the beads of a pulleyband carcass and to form therewith a chamber wherein fluid under pressure progressively swells the carcass to tire shape as said mold sections are moved into mating engagement; a collapsible bead-pressing assembly disposed between said mold sections; means for collapsing and uncollapsing said assembly to respectively facilitate insertion of said assembly into the carcass and to form with said mold sections, when in mating engagement, annular spaces in which the carcass beads are clamped and shaped; means for conducting fluid curing medium into the carcass while the beads thereof are thus clamped between said assembly and the respective mold sections; and assembly actuating means operative first to hold said uncollapsed assembly stationary with respect to one mold section during the initial separating movement of said mold sections whereby the carcass is stripped from the other mold section and then to axially move said assembly with respect to said one mold section to strip the carcass therefrom, said collapsible bead-pressing assembly comprising a plurality of pivotally mounted segments swingable outwardly from collapsed to uncollapsed position and defining annular bead contacting surfaces when in uncollapsed position.

2. In a tire curing press, the combination of a pair of complementary mold sections and means for relatively moving same from axially separated position to mating engagement and vice versa; said mold sections being designed to contact the beads of a pulley-band carcass and to form therewith a chamber wherein fluid under pressure progressively swells the carcass to tire shape as said mold sections are moved into mating engagement; a collapsible bead-pressing assembly disposed between said mold sections; means for collapsing and uncollapsing said assembly to respectively facilitate insertion of said assembly into the carcass and to form with said mold sections, when in mating engagement, annular spaces in which the carcass beads are clamped and shaped; and means for conducting fluid curing medium into the carcass while the beads thereof are thus clamped between said assembly and the respective mold sections; said assembly in its uncollapsed condition comprising a first pair of segments having inwardly extending arms and upwardly and inwardly extending links pivotally connected at their respective lower and upper ends to the arms of said first pair of segments and to said means for collapsing and uncollapsing said assembly, and a second pair of segments having inwardly extending arms and downwardly and inwardly extending links connected at their respective upper and lower ends to the arms of said second pair of segments and to said means for collapsing and uncollapsing said assembly; said means for collapsing and uncollapsing said assembly including a vertically reciprocable actuator respectively pivotally connected to the inner ends of the arms of said first pair of segments and to the lower ends of the links of said second pair of segments whereby, in collapsing said assembly, said pairs of segments are swung inwardly in opposite directions.

3. The tire curing press of claim 2 characterized further in that the ends of said pairs of segments abut each other when said assembly is in uncollapsed position so as to form substantially continuous and uninterrupted bead-contacting surfaces.

4. The tire curing press of claim 3 characterized further in that the abutting ends of said segments are circumferentially overlapped to constitute a stop for the outward swinging movements of said segments.

5. The tire curing press of claim 2 characterized further in that said assembly comprises mating collapsible subassemblies each including a pair of segments and the links connected thereto, said sub-assemblies being axially movably carried by the respective mold sections, and in that said actuator includes a pair of axially separable parts of which one part is connected to the inner ends of the arms of said first pair of segments and of which the other part is connected to the lower ends of the links of said second pair of segments.

6. The tire curing press of claim 5 characterized further in the provision of means for holding the uncollapsed subassemblies stationary with respect to the respective mold sections during initial separation of the latter whereby the carcass is axially distended.

7. The tire curing press of claim 6 characterized further in that said mold sections are relatively vertically movable whereby curing medium is drained from the distended carcass over the portions of the lower bead from which one subassembly has disengaged during the initial separating movement of said mold sections.

8. For use with a tire curing press, having complementary separable mold sections, a collapsible bead-clamping and shaping assembly comprising a circumferential series of first and second pairs of segments which have inwardly extending arms and which, in uncollapsed condition of said assembly, provide opposite annular surfaces designed to contact the inside bead surfaces of a tire carcass and thereby clamp the beads against the mold sections of such press, inwardly and upwardly extending first links having their lower ends pivotally connected to the arms of said first pair of segments, inwardly and downwardly extending second links having their upper ends pivotally connected to the arms of said second pair of segments, relatively axially movable heads to which the upper ends of said first links and the lower ends of said second links are respectively pivotally connected, and means for relatively axially moving said heads to swing said pairs of segments inwardly in opposite directions and thereby collapse said assembly for insertion into and withdrawal from a tire carcass.

9. The assembly of claim 8 characterized further in that the ends of said segments are circumferentially overlapped and abutted to constitute stops for predeterminedly positioning the segments when said assembly is in uncollapsed condition.

10. The assembly of claim 8 characterized further in that the heads to which the respective pairs of segments and links are pivotally connected are relatively axially separable, when said assembly is in uncollapsed condition, to spread apart the beads of the carcass engaged by said pairs of segments.

11. The assembly of claim 8 characterized further in that there are two sets of said heads to which the respective links and pairs of segments are connected as aforesaid, and that there are means for relatively axially moving said sets of heads.

12. In a tire curing press, the combination of a pair of complementary mold sections and means for relatively moving same between the axially separated position and position of mating engagement, said mold sections being designed to contact the beads of a pulley-band carcass and to form therewith a chamber wherein fluid under pressure progressively swells the carcass to tire shape as said mold sections are moved into mating engagement; a collapsible bead pressing assembly disposed between said mold sections, said assembly comprising a plurality of pivotally mounted segments swingable outwardly from collapsed position to uncollapsed position and defining annular bead contacting surfaces when in uncollapsed position, means for collapsing said assembly to permit insertion of said assembly into the carcass without distorting or damaging the carcass and for expanding said assembly when the carcass has been partially shaped providing space in which said assembly may operate; said assembly having bead pressing members to form with said mold sections annular spaces in which the carcass beads are clamped and shaped.

13. The tire curing press of claim 12 wherein said bead pressing members, in the uncollapsed condition of said assembly, are of diameter greater than the inside diameter of the tire carcass before shaping.

14. The tire curing press of claim 12 wherein said segments are axially offset with respect to each other in the collapsed condition of said assembly, and means mounting said segments for outward and axial swinging movements to coplanar relation in the uncollapsed condition of said assembly, such swinging of said segments occurring in the axial space between the beads of the partially shaped carcass.

15. In a tire curing press, the combination of a pair of complementary mold sections and means for relatively moving the same from axially separated positions to mating engagement and vice versa; said mold sections being designed to contact the beads of a pulley-band carcass and to form therewith a chamber wherein fluid under pressure progressively swells the carcass to tire shape as said mold sections are moved into mating engagement; a collapsible bead-pressing assembly disposed between said mold sections comprising a plurality of pivotally mounted segments swingable outwardly from collapsed to uncollapsed position and defining in said uncollapsed position opposite annular bead contacting surfaces; means for collapsing and uncollapsing said assembly to facilitate insertion of said assembly into the carcass and to form with said mold sections, when in mating engagement, such annular bead contacting surfaces against which the carcass beads are clamped and shaped; means for conducting fluid curing medium into the carcass while the beads thereof are thus clamped between said assembly and the respective mold sections; said mold sections being relatively vertically movable; an assembly actuating means operative to hold said segments of said assembly stationary with respect to the upper one of said mold sections during initial separation of said mold sections whereby the carcass may be axially distended for draining of curing medium therefrom and for stripping the carcass from the lower one of said mold sections and to move the segments of said assembly downwardly with respect to the upper one of said mold sections to engage the lower bead of the carcass to strip the latter from the upper one of said mold sections.

References Cited in the file of this patent

UNITED STATES PATENTS

| | | |
|---|---|---|
| 1,101,732 | Doughty | June 30, 1914 |
| 2,571,258 | Kolins | Oct. 16, 1951 |
| 2,603,581 | Ericson et al. | July 15, 1952 |
| 2,763,317 | Ostling et al. | Sept. 18, 1956 |
| 2,775,789 | Soderquist | Jan. 1, 1957 |
| 2,812,544 | Soderquist | Nov. 12, 1957 |